May 22, 1951  A. V. L. C. DEBRIE  2,553,898
FILM FEEDING MECHANISM
Filed Aug. 31, 1945
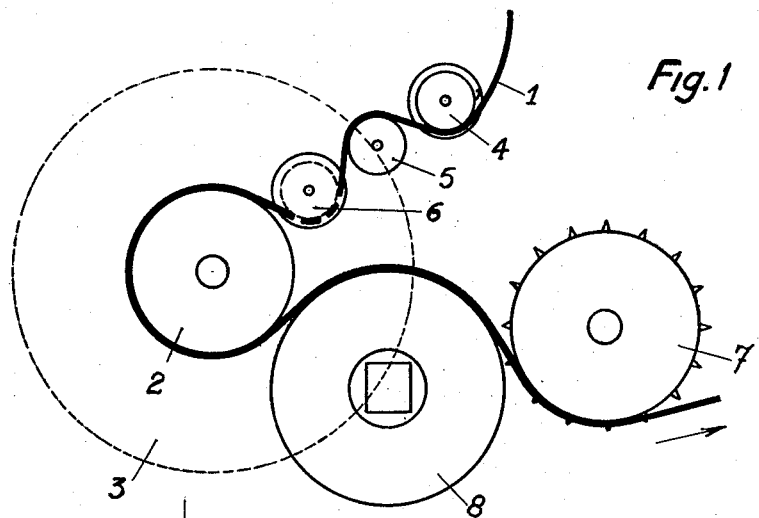
Fig. 1
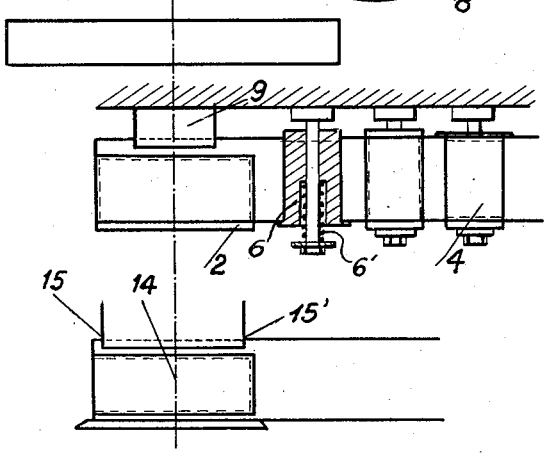
Fig. 2
Fig. 5
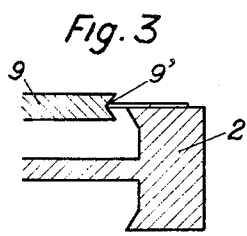
Fig. 3
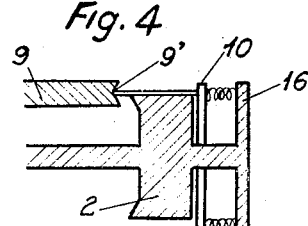
Fig. 4
Inventor:
A. V. L. C. Debrie
By E. F. Wenderoth
Atty Patented May 22, 1951

2,553,898

UNITED STATES PATENT OFFICE 2,553,898

FILM FEEDING MECHANISM

André Victor Leon Clement Debrie, Paris, France

Application August 31, 1945, Serial No. 613,936
In France February 23, 1942

Section 1, Public Law 690, August 8, 1946
Patent expires February 23, 1962

5 Claims. (Cl. 271—2.6)

In film feeding mechanisms for sound picture systems comprising a drum around which the film passes under tension and the rotation of which is regulated by a fly wheel, it is necessary not only for the film to adhere perfectly to the drum but also for the sound track to pass exactly in front of the location of the luminous spot. As this sound track is parallel with the corresponding edge of the film, it is sufficient for this edge to pass through a well defined point in front of the luminous spot. To satisfy this last condition there is generally arranged a guiding roller provided with flanges in front of the entrance of the film on to the drum. However the result obtained is not perfect because the edges of the film are not themselves perfectly rectilinear, whereby it is not always possible to avoid a certain lateral displacement of the film in front of the luminous spot.

In accordance with my present invention, I remove this draw-back by means of two guides, arranged at a certain distance from each other alongside of the film and on one side thereof, while the film is urged at an intermediate point against these guides by a force exerted from the opposite side and directed transversely with reference to the film, one of said guides being provided with a U-shaped groove which fits over the edge of the film.

Generally the guide provided with a U-shaped groove is placed adjacent at one side of the drum and has a curvature corresponding to that of the drum.

I have shown diagrammatically in the accompanying drawings several forms of execution of the arrangement which is the object of my invention.

Fig. 1 is a side view of one arrangement.

Fig. 2 is a plan view.

Figs. 3 and 4 are longitudinal cross-sections of two modifications of the incurved guide and of the parts cooperating therewith.

Fig. 5 is a plan view of the movable guide.

The film 1 passes over the drum 2 whose rotation is regulated by the fly wheel 3 after it has passed over the rollers 4, 5, 6. The film 1 is fed in the direction of the arrow, under the action of the sprocket wheel 7. Between the drum 2 and the sprocket wheel 7 the pressure roller 8 is located. In Fig. 2, it is apparent that the flange of the intermediary axially sliding roller 6 is urged by the spring 6' against one edge of the film and in its turn said flange urges the other edge of the film on one hand against the stationary flange of the roller 4 and on the other hand against an incurved guide or seat 9. This incurved guide 9, arranged at one side of the drum 2 has a curvature corresponding to that of the drum. It is constituted by a plate the edge of which is recessed so as to form a V or U-shaped groove 9' (Figs. 3 and 4). This groove 9' fits over the edge of the film 1 and prevents the unsupported portion thereof from flexing. The pressure of the flange of the roller 6 urges the edge of the film 1 into the bottom of the groove 9' of the guide 9.

In the modification shown in Fig. 4, the drum 2 is provided with a sliding flange 10 which is urged by helical springs 17 against the edge of the film opposed to the guide 9. These helical springs bear against the stationary flange 16 of the drum 2 and exert on the edge of the film 1 the pressure which was exerted in the prior form of execution by the flange of the axially sliding roller 6. This urges the opposite edge of the film 1 into the bottom of the groove 9'. In Fig. 5, it is apparent that the pressure is exerted centrally at 14 in a part intermediate between the ends 15 and 15' of the U-shaped bearing.

What I claim is:

1. In a film feeding mechanism for sound picture systems wherein a film carries the sound record, the combination of a sprocket wheel feeding said film, a photoelectric drum around which said film passes under tension, two bearing surfaces spaced from one another at one side of said film at the entrance of said film to said drum, and means for exerting a force against the opposite side of said film transversely to said film and intermediate of said surfaces urging said film against said surfaces.

2. A film feeding mechanism for sound picture systems as claimed in claim 1, wherein one of said bearing surfaces is provided with a U-shaped groove for receiving a side edge of said film.

3. A film feeding mechanism for sound picture systems as claimed in claim 1, wherein one of said bearing surfaces is provided with a U-shaped groove arranged around and to one side of the drum having a curvature corresponding to that of the drum.

4. In a film feeding mechanism for sound picture systems, wherein a film carries the sound record, the combination of a sprocket wheel for feeding said film, a photoelectric drum around which the film passes under tension, two bearing surfaces spaced from one another at one side of said film at the entrance of said film on said drum, an axially slidable roller located intermediately between said two bearing surfaces around which said film passes, a flange on said roller contacting the opposite side of said film and means for axially moving said roller and flange to urge said film against said bearing surfaces.

5. In a film feeding mechanism for sound picture systems wherein a film carries the sound record, the combination of a sprocket wheel for feeding said film, a photoelectric drum around which the film passes under tension, a first bearing surface spaced from said drum in the direction of movement of said film towards said drum and on one side of said film, a second bearing surface provided with a U-shaped guiding groove around and to one side of said drum and having a curvature corresponding to that of said drum, an axially slidable roller located intermediately between said two bearing surfaces around which said film passes, a flange on said roller contacting the opposite side of said film, and means for axially moving said roller and flange to urge said film against said bearing surfaces.

ANDRÉ VICTOR CLEMENT DEBRIE.

REFERENCES CITED

The following references are of record in the file of this patent:

UNITED STATES PATENTS

| Number | Name | Date |
|---|---|---|
| Re. 21,884 | Cavalcante | Aug. 26, 1941 |
| 1,836,613 | Oehmichen | Dec. 15, 1931 |
| 1,966,684 | Pollock | July 17, 1934 |
| 2,008,097 | Cook | July 16, 1935 |
| 2,031,756 | Boecking | Feb. 25, 1936 |
| 2,033,277 | Elmer et al. | Mar. 10, 1936 |
| 2,077,860 | Day | Apr. 20, 1937 |
| 2,102,895 | Hasbrouck | Dec. 21, 1937 |
| 2,133,820 | Kellogg | Oct. 18, 1938 |
| 2,142,606 | Debrie | Jan. 3, 1939 |
| 2,248,106 | McNabb | July 8, 1941 |

FOREIGN PATENTS

| Number | Country | Date |
|---|---|---|
| 347,950 | Great Britain | May 7, 1931 |